Aug. 19, 1952  N. H. HARRISON  2,607,053
BEEHIVE AUTOMATIC SWARM CONTROL
Filed July 25, 1950  2 SHEETS—SHEET 2
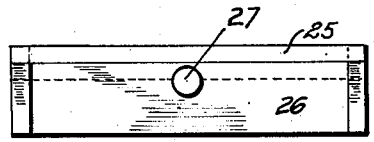
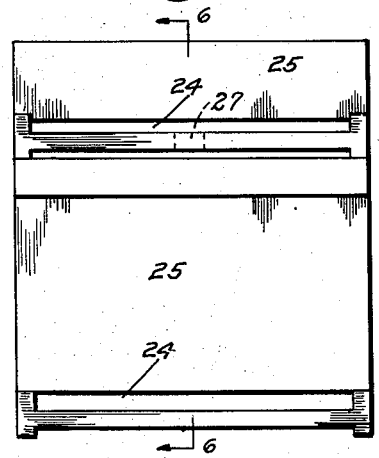
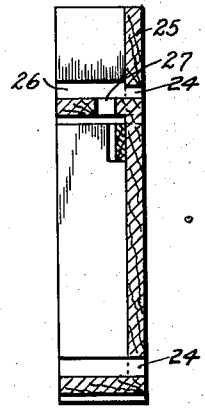
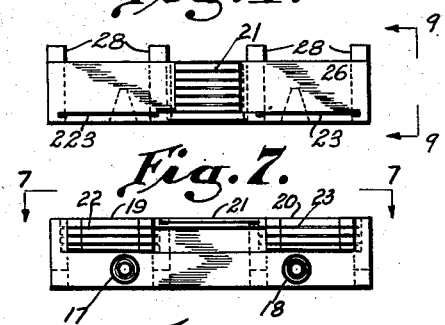
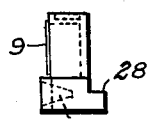
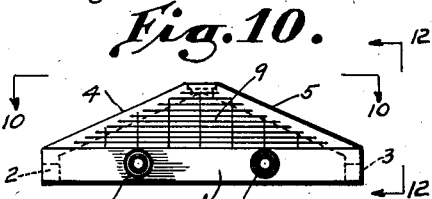
INVENTOR.
Noah N. Harrison
BY Chas. Senegre
Attorney.

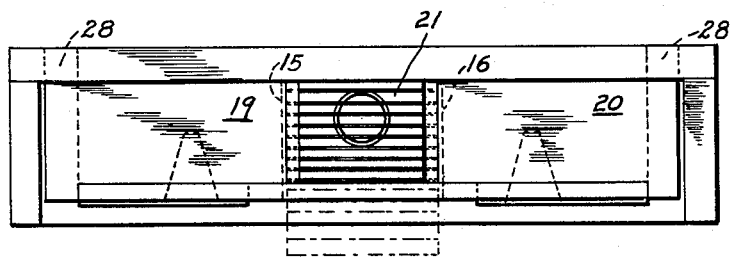

UNITED STATES PATENT OFFICE 2,607,053

BEEHIVE AUTOMATIC SWARM CONTROL

Noah H. Harrison, Birmingham, Ala.

Application July 25, 1950, Serial No. 175,730

2 Claims. (Cl. 6—7)

This invention relates to an automatic swarm control for use on beehives. It has for its main object to control the bees when swarming or leaving old hive and looking for a new home. The invention will provide simple and effective means to hold and guide the queen bee to a new hive set on top of the old hive. Bees swarming will not leave without the queen in their flight. When they discover that the queen is not present they will return to look for the queen and will find her in the control assembly or in the new hive.

A further object is to provide a control for the bees to swarm without any person being present to look after them.

Further objects are to provide such a device that will be highly efficient for the purpose intended, simple in structure, cheap to manufacture, easy to use and extremely durable.

Other objects and advantages will appear from the drawings and description.

By referring generally to the drawings, part of this application, it will be observed that Fig. 1 is a front elevational view of the control in place for use on the front of one beehive and extending upward to the bottom portion of another beehive; Fig. 2 is a sectional view on line 2—2 of Fig. 1; Fig. 3 is a top plan view of Fig. 1 and also showing the wire grill in broken lines in its outward position; Fig. 4 is a front elevational view of a regular beehive with the bottom portion of a second beehive without the control; Fig. 5 is a top plan view of Fig. 4; Fig. 6 is a sectional view on line 6—6 of Fig. 4; Fig. 7 is a plan view of the bottom portion of a beehive on line 7—7 of Fig. 8; Fig. 8 is a front view of Fig. 7; Fig. 9 is an end view on line 9—9 of Fig. 7; Fig. 10 is a plan view of the control on line 10—10 of Fig. 11; Fig. 11 is a front view of Fig. 10; Fig. 12 is an end view on line 12—12 of Fig. 11; Fig. 13 is a side view of the outer wire round guide leading from the lower portion to the upper portion of the control; Fig. 14 is an end view of Fig. 13; Fig. 15 is a side view of the inner wire round guide that telescopes within the outer guide; and Fig. 16 is an end view of Fig. 15.

Similar reference numerals refer to similar parts throughout the several views.

Referring to the drawings in detail it will be seen that the control comprises wooden members 1, as the front, 2 and 3 as ends, 4 and 5 as the upper slanting portion. The front is provided with holes 6 and 7 having wire mesh truncated cone-shaped guides 8 therein with the small ends of the guides open sufficiently for the passage inward of loaded bees, but not adapted for outward passage as the bees wings would get tangled in the ends of the wire mesh. Wire grill 9 is attached to the front and is of a size to allow unloaded bees to pass outward but too narrow to permit loaded bees to enter thereby causing them to use the cone-shaped entrances. The round wire tubes or guides 10 and 11 lead from the bottom portion of the control to the top portion, and are made telescope fashion in order to accommodate different heights of bee hives. The upper portion of the control consists of wooden members 12 as the front, 13 and 14 as ends, and 15 and 16 as guides. The front is provided with holes 17 and 18 with mesh truncated cones 8 therein the same size as the lower portion entrances. The top of the upper portion is closed with wooden members 19 and 20 with a slidable grill member 21 mounted in its center portion. Grill members 22 and 23 are mounted in the front of the upper portion. The slidable grill and the front grills are also of a size to permit unloaded bees to pass outward but not sufficiently wide to allow loaded bees to enter thereby causing the loaded bees to use the cone entrances.

A regular beehive is provided with an opening 24 along the bottom edge of the front wall 25 through which the bees leave and reenter without any control which results in requiring very much personal attention at swarming times. The ledge 26 of the upper hive has a hole 27 therethrough. The projections 28 are inserted in the opening 24 of the lower beehive.

In use the present control permits all bees except the queen bee to leave by passing out through the wires of the grills that are sufficiently apart for unloaded bees only to pass out. The queen bee being larger and unable to leave will eventually travel the inclined ceiling of the lower portion of the control, enter the connecting wire tube, travel upward therein, emerge from its top into the space in the upper portion between the guides 15 and 16 and under the slidable grill 21. Finding herself thus confined she enters the adjacent open space in the bottom edge of the new hive. When the swarm of bees discover that the queen is not in flight with them they will return, look for her and eventually find her in the upper hive. Thus it will appear that no personal attention is required.

The control may be made of any material suitable for the purpose, but I prefer to use wood, and galvanized metal for the truncated cone-shaped entrances and grills. Also the parts may be made in various capacities and sizes.

While I have shown and described the preferred embodiment of my invention, I do not wish to limit same to the exact and precise structure, but reserve the right to make all modifications and changes so long as they remain within the scope of the invention and the following claims.

Having described my invention I claim:

1. A control of the character described for use in combination with two beehives comprising; a lower portion consisting of two pieces of wood as ends, a front piece of wood attached to the end pieces, two pieces of wood attached by one end of each to the end pieces and extending upward and joined by their other ends to form an inverted V-shape, said V-shaped portion having a round hole therethrough, a wire grill tube composed of two parts with one inserted within the other telescope fashion, the lower end of said tube assembly inserted in the said hole in the V-shaped joint; an upper portion of the control, said upper portion consisting of two end pieces of wood, a front piece of wood attached by its ends to the end pieces, two top pieces of wood with one over one end portion of the upper assembly and one piece over the other end, a piece of wire grill mounted slidable in the top of the center of the upper control portion, the front wood piece of the lower control portion having a plurality of holes and the front wood piece of the upper control portion having a plurality of holes and pieces of wire grill attached on part of the front of the upper control portion; a truncated cone made of wire mesh inserted in each of said holes in the fronts of the control portions; said lower portion of the control being adapted to fit on the lower front ledge of a regular beehive, said upper portion of the control being adapted to fit on the lower front ledge of a regular beehive, said wire telescoped tube being adapted to reach from the top of the lower portion of the control to the bottom of the upper portion of the control when the lower portion is positioned on the lower front ledge of a beehive and the upper portion of the control is positioned on the lower front ledge of a beehive when two beehives are placed one upon the top of the other.

2. An automatic bee swarm control of the character described comprising; two beehives placed one upon the top of the other in combination with a control structure, said structure consisting of a lower portion having two pieces of wooden board as ends thereof, a piece of wooden board attached to the end pieces as the front, two pieces of wooden board attached by one end of each to the said end pieces and extending upward from the ends and joined together by their other ends to thus form an inverted V-shaped portion, said juncture position having a round hole therethrough, a wire grill tube composed of two parts with one inserted within the other telescope fashion, the lower end of said tube assembly inserted in the said hole in the V-shaped joint or juncture, a piece of wire grill attached on the front of this lower portion over the opening between the top of the front wooden piece and the lower edge of the pieces forming the inverted V-shape, the said front wooden piece being provided with a plurality of round holes therethrough, a truncated cone-shaped member made of wire mesh inserted in each of said holes in the front piece with the large end of the cone flush with the outer face of the front wooden piece and the truncated end of the cone extending inward and adapted for bees to pass inward therethrough, said assembled lower portion of the control positioned on the bottom front ledge of the lower beehive; an upper portion of the control consisting of two end pieces of wooden board, a front piece of wooden board attached by its ends to the said end pieces, two top pieces of wooden board with one thereof attached over one end portion of the front and one end piece and the other board attached over the other end of the front piece and one end piece, a piece of wire grill mounted slidable in the top of the center and between the ends of said top wooden pieces, a piece of wooden strip attached under each end of said piece of slidable grill, the front wooden piece of said upper control portion being provided with a plurality of round holes therethrough, two pieces of wire grill attached over open spaces in the front of this portion, a truncated cone-shaped wire mesh member inserted in each hole of the front piece, they being of similar structure and positioned similarly to the cone-shaped members in the lower portion of the control; said upper assembled portion of the control positioned on the bottom ledge of the said upper beehive with the front planes of both beehives flush with each other, the ledge of the upper beehive having a round hole therethrough, the upper end of said wire tube extended through the hole in said ledge; the lower inner edge of the lower portion of the control and the lower inner edge of the upper portion of the control having wooden extension portions inserted in the regular entrances in the bottom edges of the front walls of said regular beehives; all of the open spaces in all of said grills being of sufficient size for only unloaded bees to pass therethrough; all of said truncated cone-shaped entrances having their inner end openings of sufficient size and shape for bees to enter therethrough.

NOAH H. HARRISON.

REFERENCES CITED

The following references are of record in the file of this patent:

UNITED STATES PATENTS

| Number | Name | Date |
| --- | --- | --- |
| 1,116,922 | Rahn | Nov. 10, 1914 |